Sept. 15, 1936.  J. G. CLARKE  2,054,409
FOOD TREATING MACHINE
Filed April 10, 1934  3 Sheets-Sheet 1
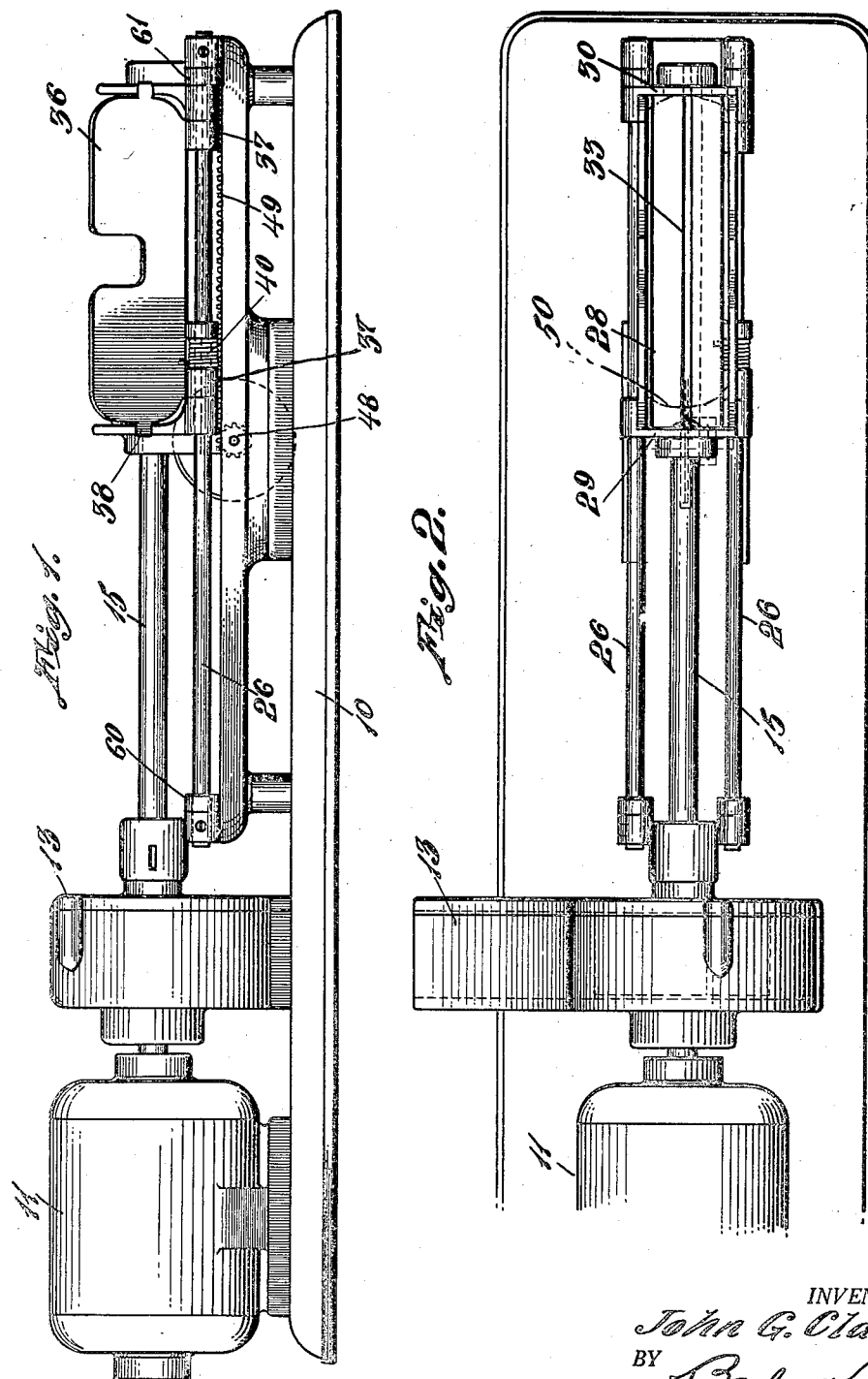
INVENTOR.
John G. Clarke
BY Barlow & Barlow
ATTORNEYS.

Sept. 15, 1936. J. G. CLARKE 2,054,409
FOOD TREATING MACHINE
Filed April 10, 1934 3 Sheets-Sheet 2
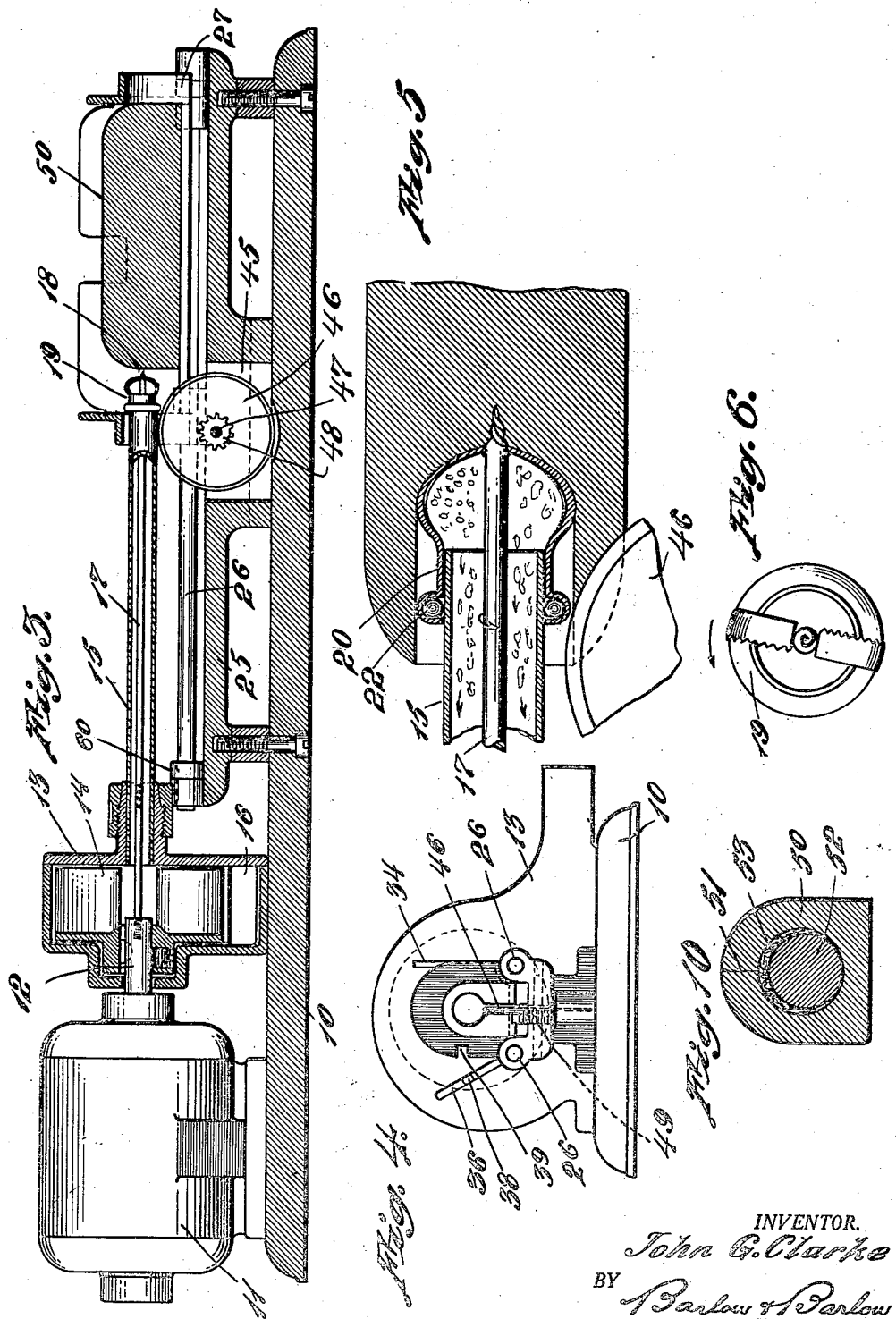
INVENTOR.
John G. Clarke
BY Barlow & Barlow
ATTORNEYS.

Sept. 15, 1936.　　　　J. G. CLARKE　　　　2,054,409
FOOD TREATING MACHINE
Filed April 10, 1934　　　3 Sheets-Sheet 3
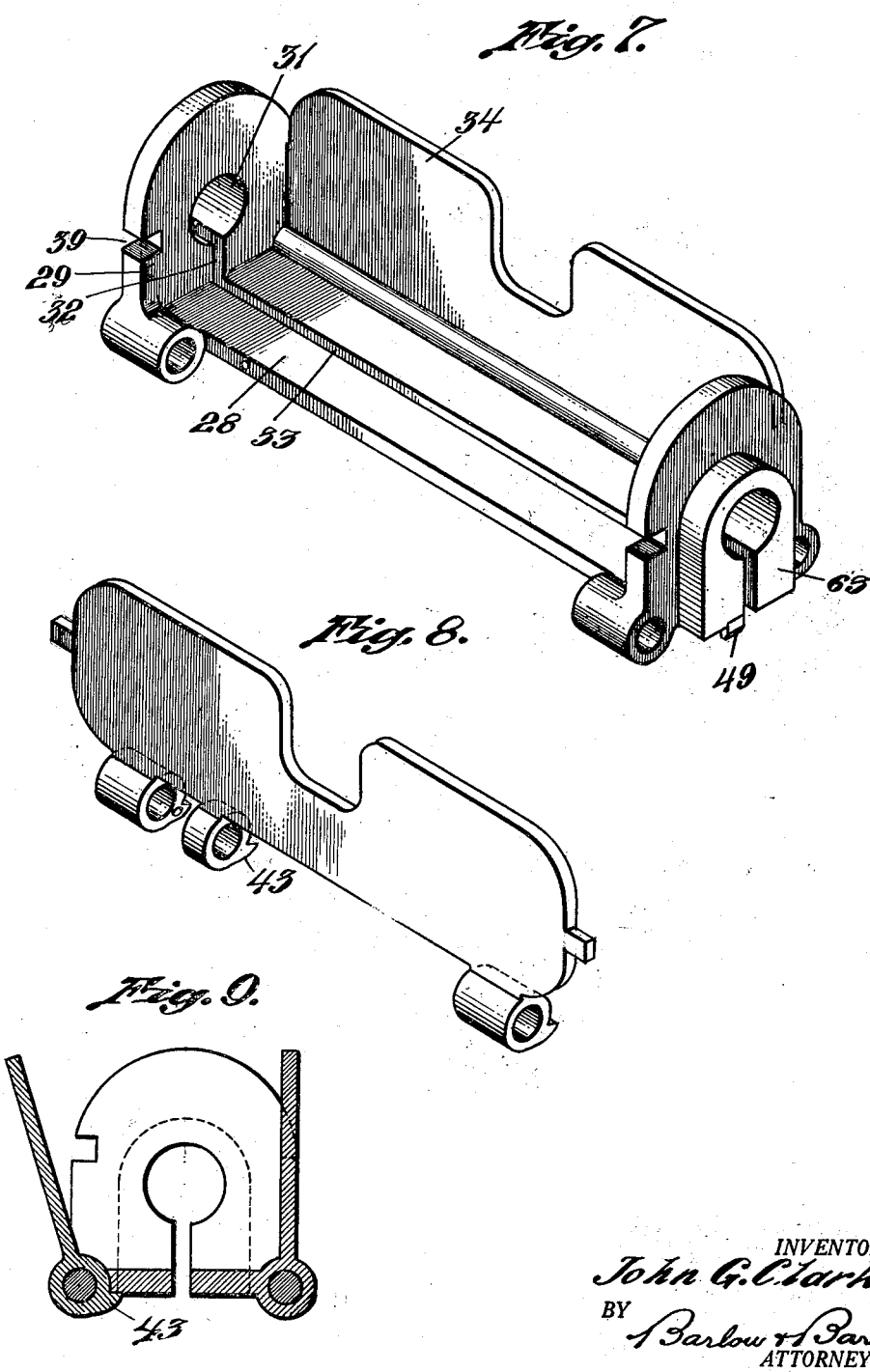
INVENTOR.
John G. Clarke
BY Barlow & Barlow
ATTORNEYS.

Patented Sept. 15, 1936

2,054,409

UNITED STATES PATENT OFFICE 2,054,409

FOOD TREATING MACHINE

John G. Clarke, Providence, R. I.

Application April 10, 1934, Serial No. 719,918

8 Claims. (Cl. 146—106)

This invention relates to the treating of food; and has for one of its objects the provision of a machine which may act upon the food in a manner to better prepare the same for handling while being eaten.

Another object of the invention is the provision of a frankfurter sandwich which may be more readily handled while being eaten.

Another object of the invention is the provision of a machine which will provide an opening in a roll or the like for the reception of an edible filling and at the same time provide an access to this opening so that the filling may be conveniently inserted therein.

Another object of the invention is the provision of a machine which will convey the material to be removed from the roll by the minimum amount of power and handling operations.

Another object of the invention is the provision of a means for boring and at the same time extracting through the boring implement the borings which are formed up and then disposing of these borings by conveying them to a desired receptacle or location.

Another object of the invention is the provision of a carriage for guiding the work while being operated upon by which the roll may be conveniently gripped and held in position and yet quickly and easily released when the carriage is retracted to position.

Another object of the invention is to provide a means by which a roll may be bored and at the same time slit so that it may thereafter be conveniently filled and eaten.

A further object of the invention is the provision of a carriage which as it is being actuated also actuates a slitting device extending into the bore of the work.

A still further object of the invention is the arrangement of the parts so that the cutter is protected against accidental contact with the person.

With these and other objects in view, the invention consists of certain novel features of construction, as will be more fully described, and particularly pointed out in the appended claims.

In the accompanying drawings:

Fig. 1 is a side elevation of my machine;

Fig. 2 is a top plan view thereof;

Fig. 3 is a sectional view illustrating the parts of the operating device in section;

Fig. 4 is an end view;

Fig. 5 is an enlarged sectional detail of the cutting or operating elements as extending into the work;

Fig. 6 is a sectional view on line 6—6 of Figure 5 showing the cutter alone;

Fig. 7 is a perspective view of the carriage;

Fig. 8 is a perspective view of the movable side of the carriage;

Fig. 9 is a sectional view through the carriage;

Fig. 10 is a sectional view of the work with the filling inserted therein.

While this machine is adaptable for many uses, one of the uses which I have particularly in mind is for the serving of frankfurters. Frankfurters are usually served by slitting a roll with a knife and inserting the frankfurter in this slit, and mustard, pickle or some dressing is then placed on the frankfurter in the roll. The halves of the roll flare outwardly to considerable extent by reason of the position of the frankfurter between the halves in this position, and when one bites into such a sandwich, the frankfurter is very liable to slip about and the mustard or dressing squeezed out upon the hands or clothing, and even with the greatest care a sandwich of this character is difficult to manage or handle. This invention has to do with the making of a bore in or hole through the roll of a size to receive a frankfurter and to split the frankfurter from its top edge towards the hole so that it may be opened up, the frankfurter and dressing placed therein, and then completely closed about the frankfurter so that one may hold the sandwich in closed position and prevent the frankfurter from slipping about and the dressing on the frankfurter being squeezed out when a bite is taken; and I have provided a machine by which both the boring and slitting operations may be accomplished at the same time by merely placing the roll into the carriage provided for it and manually sliding this carriage forwardly a distance substantially the length of the roll and then retracting it; and the following is a detailed description of the present embodiment of the invention, illustrating the preferred means by which these advantageous results may be accomplished:

With reference to the drawings, 10 designates a base upon which I have mounted a motor 11 with its armature shaft 12 protruding from one end. Adjacent this motor, there is provided a fan casing 13 containing a suction fan 14 mounted upon the armature shaft 12 to rotate therewith, while protruding from this casing 13 I have provided a rigid tube 15 which communicates with the fan chamber and which serves to convey air and such particles as may be carried by the air through the tube 15 and discharge it through the opening 16 from the fan casing. A shaft 17 is fixed to the armature shaft 12 to rotate therewith and to extend longitudinally through the tube 15 and is pointed at its outer end 18 for the purpose of piercing the work and directing the path of travel of a cutter member. A helical groove in this tapered end may serve to assist in its operation.

The cutter member is designated generally 19 and comprises a tubular body 20 which is suitably secured to the shaft 17. The body 20 extends along the tube 15 and is provided with ball bearings 22 to guide the cutter 19 in its rotation. The cutter 19 is provided with a pair or more of cutting blades 23 the leading edge portion of each blade having a serrated cutting edge which serves to chew up into fine particles the material through which it is passed, and these fine particles are sucked by the fan 14 through the tube 15 and discharged from the fan casing 16 into a suitable container for them.

Positioned on the base 10 and projecting beneath the tube 15, I have provided a platform 25 supported by legs, and upon this platform is mounted a pair of guide rods 26 constituting a track which slidably mounts a carriage 27 having a bottom wall 28, end walls 29 and 30 with central slots or openings 31, 32, 33 therethrough for the passage of the cutting implements, while a side wall 34 is fixed to the bottom wall and end walls along one side of the bottom wall. Also on this bottom wall there are provided bearings 35 for the reception of the guide rods or tracks 26. The carriage also includes a side wall 36 which, itself, has bearings 37 hingedly mounted upon one of the side rods 26 and located between the slide bearings 35. This wall is of a shape comparable to its opposite wall 34 and is provided with projections 38 to extend into slots 39 in the end walls of the carriage to limit the inward swinging movement of the side wall 36. It is desirable that this side wall shall swing outwardly when released so that its normal position will be such as illustrated in Figure 9; and in order that this may be accomplished, I have provided a spring 40 encircling one of the rods 26 and held in position by having its ends project into openings one in the side 36 and the other in the bottom 28, there being a tension on the spring tending to swing the side wall about one of the rods as an axis into a position such as illustrated in Figure 4 or Figure 9, and this wall is limited in its outward swinging movement by movement of the stop 43 provided thereon.

I have formed a slot 45 in the middle of the platform 25 in which is mounted a circular disc or cutter 46 upon shaft 47 having bearings in the platform 25. Fixed to this cutter, either directly or through the shaft 47, I have provided a spur gear 48 which engages with a rack 49 fixed on the carriage so that as this carriage is slid along the rods 26, this cutting disc 46 will be rotated to slit the roll by reason of its movement through the slots 32, 33 of the carriage.

In operation, it is merely necessary to drop a roll with its top downward into the carriage, grasp the sides of the carriage 34 and 36 and swing the side 36 inwardly sufficiently to grip the roll and hold it in position, and then slide the carriage forwardly towards the motor which is running to operate the cutter to bore a hole through the roll and at the same time slit the roll 50 as at 51, see Figure 7. The opposite ends of the stroke of the carriage are cushioned by resilient abutments 60 at one end and 61 at the other.

After the carriage is retracted, the sides may be released, the roll picked out, spread apart, and the frankfurter 52 with the dressing 53 placed thereon, and the roll then closed to securely hold the frankfurter and dressing in position. At the same time as this boring operation takes place, the particles which are removed to form the hole through the roll are chewed into fine bits, and these borings are sucked out by the fan and deposited in a receptacle so that they do not fly about or accumulate in the area about which the machine is mounted.

The ends of the carriage are thickened as at 63 and the stroke of the carriage so arranged that the cutter 19 will locate therein at each end of its stroke and be housed so that danger of accidental contact with the rotating cutter will be reduced to a minimum.

This device may be operated quickly and efficiently, and the serving of the frankfurter material is enhanced.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a food treating machine, a fixed tube, a tubular boring member supported at the end of said tube and rotatable relative thereto, a rotatable shaft extending through said tube for operating said member, means to rotate said shaft and means simultaneously operated by said shaft rotating means for conveying the borings through said tube.

2. In a food treating machine, a tubular boring means for providing finely divided borings, means for extracting the borings through said tubular means, a carriage for advancing the work with reference to said boring means, and an additional element for operating on the work actuated by the advancement of said carriage.

3. In a food treating machine, a boring means, means for driving the boring means, a cutter for slitting the work, and means for actuating the cutter upon movement of the work towards the boring means.

4. In a food treating machine, a boring means, means for driving the boring means, a circular cutter for slitting the work, a carriage for the work, and means for actuating the cutter upon movement of the carriage towards the boring means.

5. In a food treating machine, a boring means, means for driving the boring means, a circular cutter for slitting the work, a carriage for the work, a gear on said cutter, and a rack on said carriage to engage said gear and actuate said cutter upon movement of the carriage towards the boring means.

6. In a food treating machine, a rotary boring means, movable slitting means positioned adjacent to said boring means, means for rotating said boring means, means for advancing the work to be bored towards and into said boring means and said slitting means, and means for actuating the slitting means upon movement of the work towards the boring means whereby boring and slitting of the work will be performed thereon.

7. In a food treating machine, a rotary boring means, movable slitting means positioned adjacent to said boring means, means for rotating said boring means, means for advancing the work to be bored towards and into said boring means and said slitting means, means for actuating the slitting means upon movement of the work towards the boring means whereby boring and slitting of the work will be performed thereon, and means simultaneously operated by said rotating means driving the rotary boring means for extracting the borings away from the work.

8. In a food treating machine, a rotary boring means, a rotary slitting cutter positioned adjacent to and beneath said boring means, means for rotating said boring means, means including a movable work support for advancing the work to be bored towards and into said boring means and said slitting means, means for actuating the cutter upon movement of the work towards the boring means whereby boring and slitting of the work will be performed, and means for extracting the borings away from the work simultaneously during boring and slitting thereof.

JOHN G. CLARKE.